United States Patent [19]
Yu et al.

[11] Patent Number: 5,619,439
[45] Date of Patent: Apr. 8, 1997

[54] SHARED HARDWARE FOR MULTIPLY, DIVIDE, AND SQUARE ROOT EXPONENT CALCULATION

[75] Inventors: Robert K. Yu, Newark; Grzegorz B. Zyner, San Jose, both of Calif.

[73] Assignee: Sun Microsystems, Inc., Mountain View, Calif.

[21] Appl. No.: 498,420

[22] Filed: Jul. 5, 1995

[51] Int. Cl.$^6$ .................................................. G06F 7/38
[52] U.S. Cl. .................................................. 364/748
[58] Field of Search .......................... 364/715.01, 736, 364/748, 757, 764, 752, 758, 759, 760, 765, 766, 767, 715.04

[56] References Cited

U.S. PATENT DOCUMENTS

| | | | |
|---|---|---|---|
| 4,975,868 | 12/1990 | Freerksen | 364/748 |
| 5,150,320 | 9/1992 | Nakayama | 364/748 |
| 5,548,545 | 8/1996 | Brashears et al. | 364/748 |

OTHER PUBLICATIONS

Claude P. Lerouge, Pierre Girard, Joel S. Colardelle, "A Fast 16 Bit NMOS Parallel Multiplier", IEEE Journal of Solid-State Circuits, vol. SC–19, No. 3, Jun. 1984 pp. 338–342.
Ramautar Sharma, Alexander D. Lopez, John A. Michejda, Steven J. Hillenius, John M. Andrews, Arnold J. Studwell, "A 6.75-ns 16×16-bit Multiplier in Single-Level-Metal CMOS Technology", IEEE Journal of Solid-State Circuits, vol. 24, No. 4, Aug. 1989 pp. 922–926.

W.K. Luk, J.E. Vuillemin, "Recursive Implementation of Optimal Time VLSI Integer Multipliers", 1983 pp. 155–168.

Primary Examiner—Chuong D. Ngo
Attorney, Agent, or Firm—Limbach & Limbach L.L.P.

[57] ABSTRACT

The same hardware is used to implement calculations of the exponents for multiplication, division, and square root in either double or single precision. A multiplexor selects the appropriate bias value necessary for exponent computation for the given instruction type, operand precision, and output precision. A first operand multiplexor selects either the exponent of the first operand in the case of a multiplication or division instruction, and selects zero in the case of a square root instruction, since the square root operation only requires one operand. The second operand multiplexor selects the second exponent in the case of a multiplication instruction, the one's complement of the second exponent in the case of a division instruction, and the second exponent divided by two during a square root operation. Flip-flop registers latch the exponent and incremented exponent when a division or square root operation is pending. A multiplexor select between the presently calculated exponents and the saved exponents calculated for a pending division or square root operation. If the instruction scheduler has flexibility in allowing out of order instruction completion, younger multiplication instructions can be dispatched and completed during the several machine cycles during which the division/square root mantissa computation.

34 Claims, 4 Drawing Sheets

SINGLE PRECISION:

DOUBLE PRECISION:

FIG. 1

(PRIOR ART)

SHARED HARDWARE FOR MULTIPLY, DIVIDE, AND SQUARE ROOT EXPONENT CALCULATION

BACKGROUND OF THE INVENTION

1. Field of the Invention

The present invention relates to the field of floating point exponent calculations in microprocessors. Specifically, the present invention relates to sharing exponent calculation hardware between a multiplication mantissa unit and a division/square root mantissa unit.

2. Discussion of the Related Art

Figure 1:
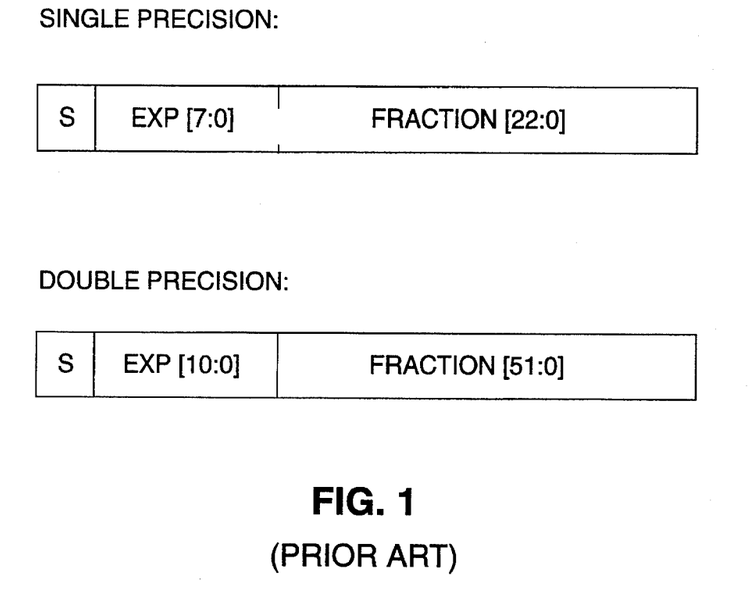
FIG. 1 shows the standard IEEE single precision and double precision floating point representations.

FIG. 1 shows the IEEE standard floating point data formats. The floating point value definitions of the floating point data formats illustrated in FIG. 1 are described below by equations 1, 2, and 3.

s=sign
e=biased exponent
f=fraction
E=number of bits in exponent (8 for single, 11 for double)
F=number of bits in fraction (23 for single, 52 for double)
B=exponent bias (127 for single, 1023 for double)
Normalized Value ($0<e<2^{E-1}$):

$$(-1)^s \times 2^{e-B} \times 1.f \qquad (1)$$

Subnormal Value (e=0):

$$(-1)^s \times 2^{1-B} \times 0.f \qquad (2)$$

Zero:

$$(-1)^s \times 0 \qquad (3)$$

A floating point number is analogous to a number in scientific notation with the primary difference being in the IEEE standard, the number is in a base 2 number representation system whereas in standard scientific notation, numbers are represented in base 10. Thus, a standard floating point number has an exponent which represents the binary order of magnitude by which its mantissa must be multiplied. In a normalized floating point number, the implicit leading 1 and all F fraction bits are significant. Therefore, the mantissa of a normalized floating point number always has F+1 significant binary digits in the mantissa.

The IEEE standard for floating point numbers includes two different precisions of floating point numbers. The first type, single precision floating point numbers, have 23 fractional bits and 8 exponent bits; whereas the second type, double precision floating point numbers, have 52 fraction bits and 11 exponent bits, Binary multiplication of two floating point numbers M1 and M2 is analogous to the multiplication of two base 10 numbers in scientific notation. The mantissas of the operands M1 and M2 are multiplied by each other to produce the resultant mantissa while the exponents E1 and E2 of the operands M1 and M2 are added to produce the resulting exponent Er.

In calculating the resulting exponent Er for a floating point unit, the various cases should be examined. In multiplication, the resultant exponent Er is calculated by the following equation.

$$Er = E1 + E2 - B - z \qquad (4)$$

In the above equation, if one of the mantissas is subnormal, z equals the number of leading zeros in the subnormal mantissa; otherwise, z is zero. Multiplication is not supported for the case of two subnormal mantissas because the result would always be less than the smallest subnormal number, which is the minimum representable non-zero number.

If Er<1, then the resultant mantissa must be right-shifted by a number of bits so as to counteract setting the resultant exponent to one, which is an exponent's logical minimum value. This quantity, rshift, is calculated by the following equation.

$$rshift = 1 - Er$$

There are four output cases in floating point multiplication which warrant discussion. The first case is "real" or "gross" underflow. Gross underflow occurs when Er<1 and rshift>24 for single precision output, and rshift>53 for double precision output. In this case, the resultant mantissa is shifted to the sticky bit position or beyond. The correct output in this case is either zero or the smallest subnormal number, depending upon the rounding mode.

The second case occurs when Er<1 and rshift≦24 for single precision outputs, and rshift≦53 for double precision outputs. In this case, the correct output is a subnormal number. Therefore, the exponent field of the output is set to zero to indicate that the output is subnormal, but the output exponent value Er is interpreted as being one.

The third case occurs when the output is normal; therefore, Emin≦Er≦Emax for the given precision. For single and double precision outputs, Emin=1. For single precision outputs, Emax=255, while for double precision outputs, Emax=2047.

The fourth case occurs when the output overflows the range of representable numbers for the given level of precision. Thus, when Er>Emax, the output has overflown and cannot be represented.

If the leading zero detection is not performed and a subnormal operand is allowed, then the calculated resulting exponent is represented by the following equation.

$$Er = E1 + E2 - B \qquad (5)$$

When Er=1 and the most significant bit of the mantissa is one, the result is normal. When Er=1, the most significant bit of the mantissa is zero, and the fraction is non-zero, the result is subnormal. When Er=1, the most significant bit of the mantissa is zero, and the fraction is zero, gross underflow occurs.

When Er<1, the resulting mantissa needs to be shifted to the right. After such a shifting, the fraction may or may not be all zero, corresponding to gross underflow or a subnormal result, respectively. It is impossible to know whether gross underflow or a subnormal result occurs without knowing how many leading zeros were present in the subnormal operand mantissa.

If Er>1 and one of the operands is subnormal, the resulting mantissa needs to be shifted to the left. After such a shifting, the fraction may or may not be all zero, corresponding to gross underflow or a subnormal result, respectively.

Usually, it is desirable that the result R produced by a multiplication will have the same precision (the same number of significant bits) as each of the operands. If the multiplier produces 2F significant mantissa fraction bits, while the result R can include only F significant mantissa fraction bits, the least significant F mantissa bits output by the multiplier are used only to produce the three rounding bits—the guard, round, and sticky bits—for rounding purposes. The least significant F mantissa bits are then discarded.

To perform a floating point division exponent computation, the resulting exponent Er is calculated by the following equation.

$$Er=E1-E2+B+z \qquad (6)$$

In square root computations, there is only one operand. The operand's exponent is E2. To perform a floating point square root exponent calculation, the resulting exponent is calculated by the following equations.

$$Er=((E2-z-B)/2)+B \qquad (7)$$

$$Er=((E2-z-B-1)/2)+B \qquad (8)$$

Equation 7 applies when the square root operand is normal and its exponent E2 is odd. Because the operand is normal, there are no leading zeros in the mantissa ($z=0$). Equation 7 also applies when the operand is subnormal ($E2=1$) and the number of leading zeros is even. In this case, the operand exponent would be odd if the number representation system allowed the representable range to be expanded such that the subnormal number could be written in normal form.

Equation 8 applies when the operand is normal and its exponent E2 is even, thus there are no leading zeros in the mantissa ($z=0$). Equation 8 also applies when the operand is subnormal ($E2=1$) and the number of leading zeros is odd. In this case, the operand exponent would be even if the number representation system allowed the representable range to be expanded such that the subnormal number could be written in normal form.

The above equations 7 and 8 can be rewritten using standard algebra by noting that subtracting 1 in the second equation is not needed in integer binary arithmetic since the fraction is truncated anyway. The resulting equation is the following.

$$Er=[(E2-z-B)/2]+B \qquad (9)$$

Equation 9 simplifies to the following.

$$Er=(E2-z+B)/2 \qquad (10)$$

Figure 2:
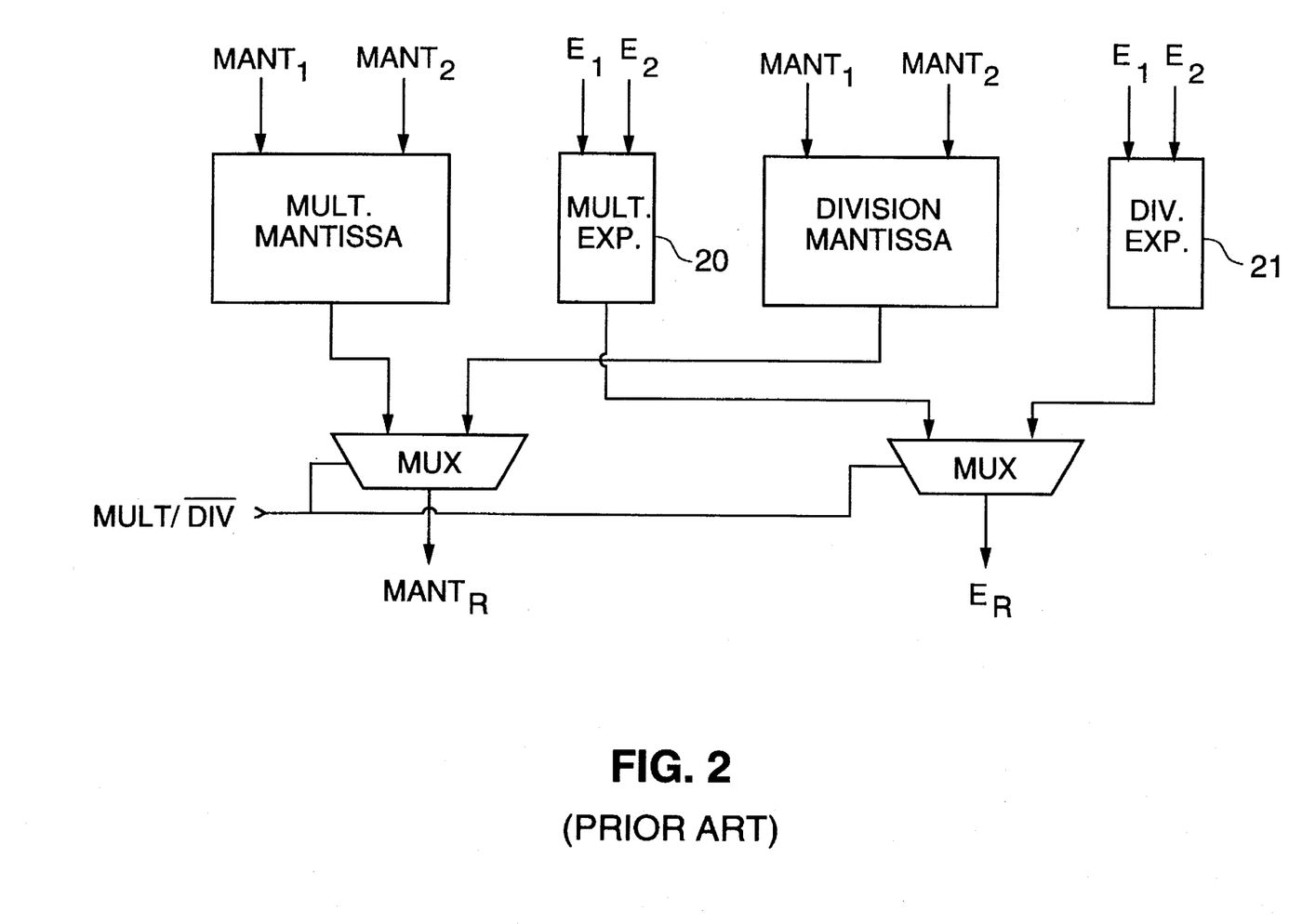
FIG. 2 is a simplified block diagram showing hardware partitioning in a floating point unit having a multiplier and divider according to the prior art.

FIG. 2 is a simplified block diagram illustrating how floating point multiplication and division are typically implemented in the prior art. The prior art uses separate exponent calculation units 20 and 21 are used for multiplication and division, respectively, because the exponent computations required for multiplication and division are different.

It is evident from the above discussion that it is desirable to avoid having to implement a separate rounding unit for each floating point mantissa unit.

SUMMARY OF THE INVENTION

A first object of the present invention is to provide a floating point exponent unit which can be shared between more than one mantissa unit. According to the present invention, a multiplier and square/root unit share the same exponent calculation hardware.

A second object of the present invention is to allow multiplication instructions to execute during the cycles when a division instruction mantissa computation is pending. This is useful when the instruction scheduler has flexibility to allow out of order instruction completion.

According to the present invention, by ignoring the leading zeros adjustments necessary if subnormal operands are allowed, the equations for the exponent calculations for multiplication, division, and square root are simplified. The same hardware is used to implement calculations of the exponents for multiplication, division, and square root in either double or single precision. A multiplexor selects the appropriate bias value necessary for exponent computation for the given instruction type, operand precision, and output precision. A first operand multiplexor selects either the exponent of the first operand in the case of a multiplication or division instruction, and selects zero in the case of a square root instruction, since the square root operation only requires one operand. In the case of a multiplication instruction, the second operand multiplexor selects the second exponent. In the case of a division instruction, the second exponent multiplexor selects the one's complement of the second exponent. During a square root operation, the second exponent multiplexor selects the second exponent divided by two. Flip-flop registers latch the exponent and incremented exponent, respectively, when a division or square root operation is pending. A multiplexor selects between the presently calculated exponents and the saved exponents calculated for a pending division or square root operation.

The various aspects and features of the present invention are apparent from the drawings as explained in the detailed description.

DETAILED DESCRIPTION OF THE INVENTION

According to the present invention, by ignoring the leading zeros adjustments necessary if subnormal operands are allowed, the equations for the exponent calculations for multiplication, division, and square root are as follows.

Multiplication:

$$Er=E1+E2-B \qquad (11)$$

Division:

$$Er=E1-E2+B \qquad (12)$$

Square Root:

$$Er=(E2+B)/2 \qquad (13)$$

Figure 3:
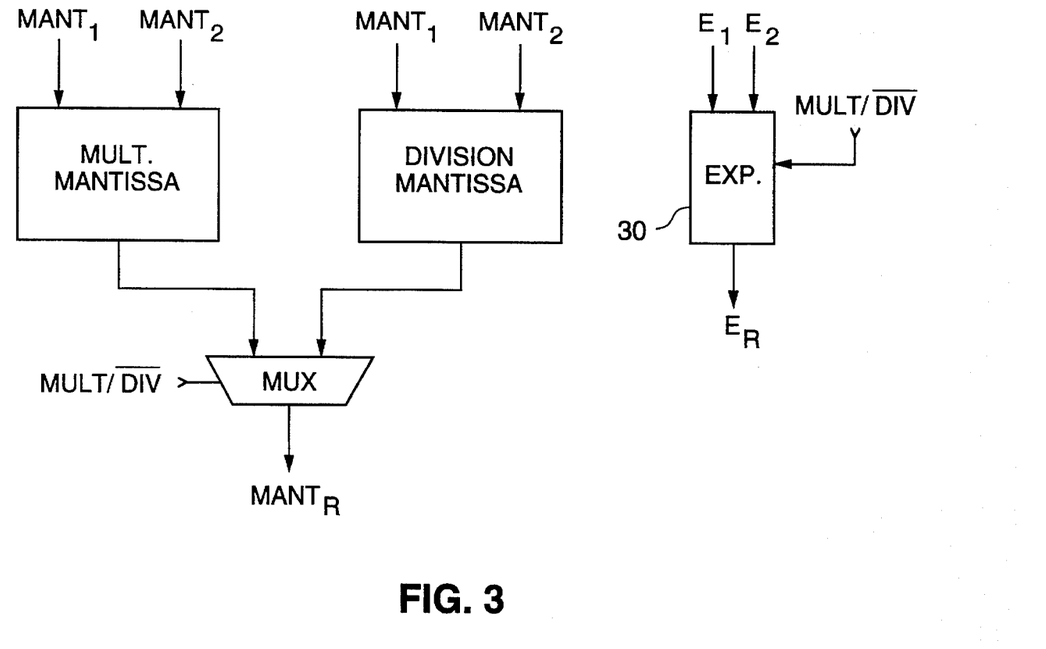
FIG. 3 is a simplified block diagram showing hardware partitioning in a floating point unit having a multiplier and divider with shared exponent calculation unit according to the present invention.

FIG. 3 is a simplified block diagram illustrating that the same hardware 30 is used to compute the resultant exponent Er for multiplication and division/square root operations according to the present invention. According to the present invention, the same hardware 30 is used to implement calculations of the exponents for multiplication, division, and square root in either double or single precision.

Figure 4:
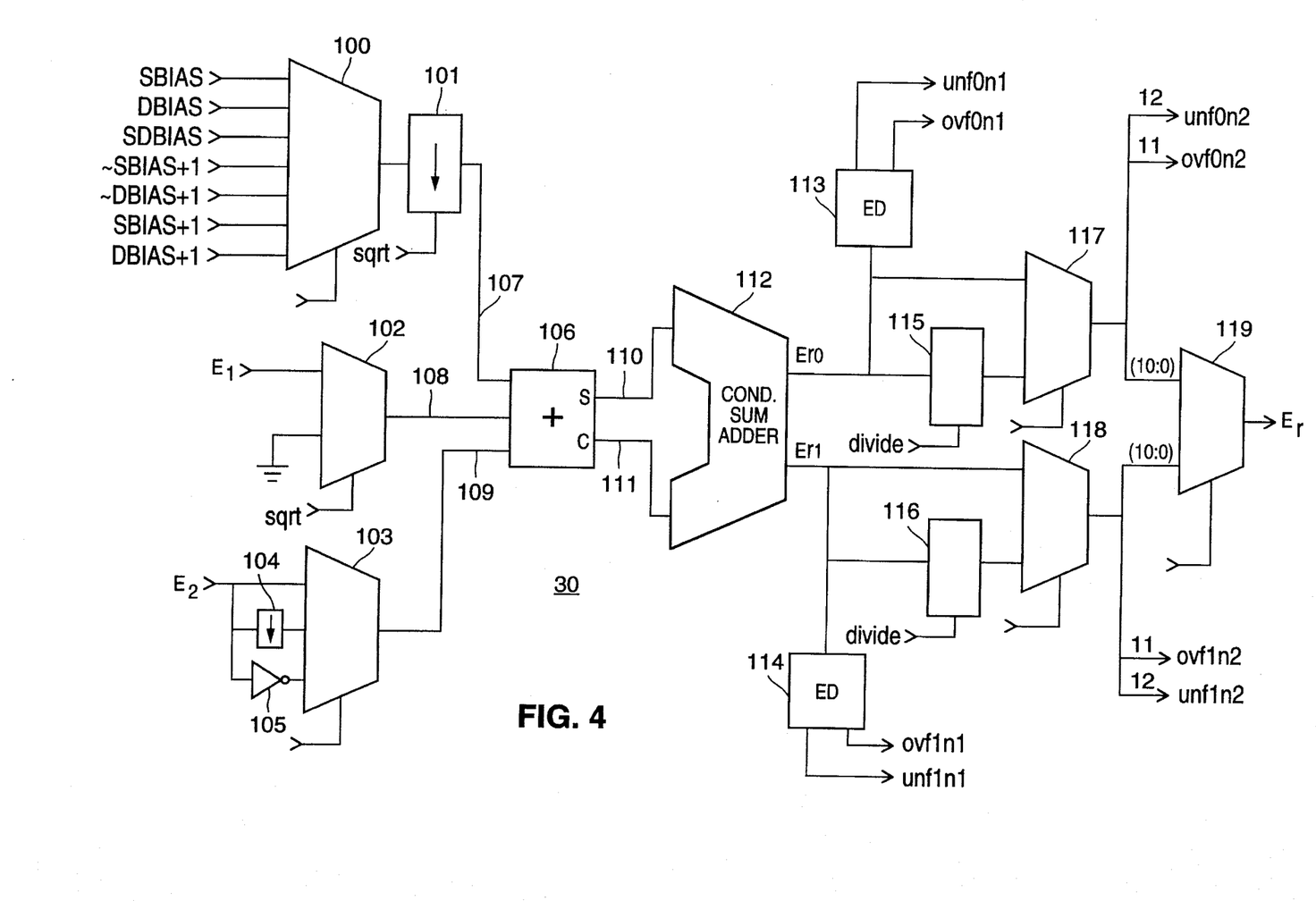
FIG. 4 is a logical schematic of the preferred embodiment of the exponent calculation unit according to the present invention.

FIG. 4 shows a logical block diagram of the exponent datapath 30 according to the present invention. In FIG. 4, multiplexor 100 selects an appropriate value for the bias B, depending upon the precisions of the operands and output, and depending upon the type of operation being performed.

Equations 11, 12, and 13 can be rewritten to adhere to two's complement representations of negative numbers. The resulting equations are as follows.

Multiplication:

$$Er = E1 + E2 + (/B + 1) \quad (14)$$

Division:

$$Er = E1 + (/E2 + 1) + B \quad (15)$$

Square Root:

$$Er = (E2 + B) \gg 1 \quad (16)$$

The equation 16 for the square root exponent calculation takes advantage of the fact that division by two in binary is equivalent to right shifting by one bit position.

Multiplexor 100 selects the appropriate bias value for the given operand and output precisions. The following table shows the bias values and the operations to which they correspond.

| Bias | Hex | Operations | Inputs | Outputs |
| --- | --- | --- | --- | --- |
| SBIAS | 007F | divide | single | single |
| | | sqrt (E2 even) | single | single |
| DBIAS | 03FF | divide | double | double |
| | | sqrt (E2 even) | double | double |
| SDBIAS | 0301 | multiply | single | double |
| ~SBIAS + 1 | 1F81 | multiply | single | single |
| ~DBIAS + 1 | 1C01 | multiply | double | double |
| SBIAS + 1 | 0080 | sqrt (E2 odd) | single | single |
| DEIAS + 1 | 0400 | sqrt (E2 odd) | double | double |

Right-shifter 101 takes the bias value output by the multiplexor 100 and shifts the bias to the right by one bit position during a square root operation. This is equivalent to a binary divide by two. When any other type of operation is being performed, a multiplication or division, the right shifter 101 passes its input directly to its output without shifting. Right-shifter 101 is preferably implemented as a 2-to-1 multiplexor in which its first input has the output of the bias multiplexor 100 connected directly, while its second input has the output of the bias multiplexor connected in a manner such that the least significant bit is discarded, all other bits are shifted in the less significant direction, and the most significant input is connected to ground. For timing purposes, the hardware shown in FIG. 4 implements equation 16 as follows.

$$Er = (E2 \gg 1) + (B \gg 1) \quad (17)$$

The parentheses in equation 17 indicate that the right shifting is done prior to the addition. However, equation 17 is not always equivalent to equation 16. If E2 is even, its least significant bit is zero, and equations 16 and 17 are the same. Under these circumstances, equations 16 and 17 are the same because no carry can propagate from the least significant bit position during the addition of E2 and B prior to shifting out the least significant bit according to equation 16.

However, if E2 and the Bias B are both odd, the addition of E2 and B in equation 16 will always propagate a carry out of the least significant bit position before the least significant bit is shifted out (truncated). The single precision bias is 127, and the double precision bias is 1023, both of which are odd. When E2 and B are both odd, the addition in equation 16 always produces a carry out of the least significant bit position because the least significant bit of E2 and the least significant bit of B are both ones. However, this carry will be lost if equation 17 is implemented, since both of the ones at the least significant bits of E2 and the bias B will be shifted out before the addition that produces a carry. To force equations 16 and 17 to be equal in all cases, the true bias value is used when E2 is even, and bias+1 is used when E2 is odd so that the lost carry is regained. The determination of whether or not E2 is odd or even is very straightforward. E2 is odd when its least significant bit is one and is even when its least significant bit is zero.

Right shifter 104 shifts the exponent of the second operand E2 to the right by one bit position. Since this shifting operation is unconditional, it is preferably accomplished by wiring E2 to an input of the 3-to-1 multiplexor 103 so that the least significant bit of E2 is discarded, the most significant input to the multiplexor 103 is grounded, and all the remaining bits of E2 are connected to the multiplexor input of one bit less significance. In this manner, no transistors are needed to perform the shifting. Inverter 105 provides the one's complement of E2 to an input of 3-to-1 multiplexor 103.

Multiplexor 102 selects either the exponent of the first operand E1 in the case of a multiplication or division instruction, and selects zero (ground) in the case of a square root instruction, since the square root operation only requires one operand. The exponent hardware 30 is designed so that the second operand having exponent E2 is the square root operand. Multiplexor 103 selects either the exponent of the second operand E2, the one's complement of E2, or E2 divided by two, depending upon the type of instruction. In the case of a multiplication instruction, multiplexor 103 selects E2. In the case of a division instruction, multiplexor 103 selects the one's complement of E2. During a square root operation, multiplexor 103 selects E2 divided by two (right shifted by one bit position).

Carry save adder 106 has three inputs and sum and carry outputs. Inputs 107, 108, & 109 are added to produce the sum 110 and carry 111 outputs. The sum output 110 and carry output 111 together represent "Er0" in redundant carry-save form.

Conditional sum adder 112 reduces the sum and carry portions of Er0 into non-redundant form. The conditional sum adder 112 has two outputs, Er0 and Er1, which are always related by the following equation.

$$Er1 = Er0 + 1 \quad (18)$$

After the conditional sum adder 112 combines the carry 111 and sum 110 portions of the calculated quantities above, it outputs Er0 and Er1. A conditional sum adder takes two inputs, A and B, and produces two outputs, Z0 and Z1, such that Z0=A+B, and Z1=A+B+1. The outputs of the conditional sum adder shown in FIG. 4 are labeled Er0 and Er1. In the case of multiplication, Er0 is the non-overflow exponent, while Er1 is the overflow exponent.

Each multiplication takes two operands. If both multiplication operands are normalized floating point numbers, then the mantissa for the first multiplication operand is 1.f1, and the mantissa for the second multiplication operand is 1.f2. Because each normalized number has an implicit leading 1, every normalized number has F+1 significant bits. The result output by the multiplier takes the form 1.fr, where the number of bits in the fraction part fr is either 2F or 2F+1, depending upon the sizes of f1 and f2. Non-overflow occurs when the number of bits in the fraction part is 2F. Overflow occurs when the number of bits in the fraction part is 2F+1.

The overflow/non-overflow distinction is easily understood with a base 10 analogy. Consider 11*11=121. In scientific notation, this is $1.1 \times 10^1 * 1.1 \times 10^1 = 1.21 \times 10^2$. Here, the number of fraction digits in the mantissa result is twice the number of fraction digits in each of the inputs—this is a non-overflow example. Now consider 99*99=9801. In scientific notation, this is $9.9 \times 10^1 * 9.9 \times 10^1 = 98.01 \times 10^2 = 9.801 \times 10^3$. Here, the number of fraction digits in the normalized output is one plus twice the number of fraction digits in each of the inputs—this is an overflow example. In the overflow situation, the normalized exponent must be incremented by one, while the decimal point is moved one place to the left to produce a normalized mantissa.

When overflow occurs in a floating point multiplication, the decimal point of the resultant mantissa is moved one bit position over to the left, and the exponent is incremented. Thus, in an overflow condition, the resultant exponent for multiplication is calculated as follows.

$$Er=E1+E2-B+1 \qquad (19)$$

Equation 19 is equation 11 plus one.

Figure 5:
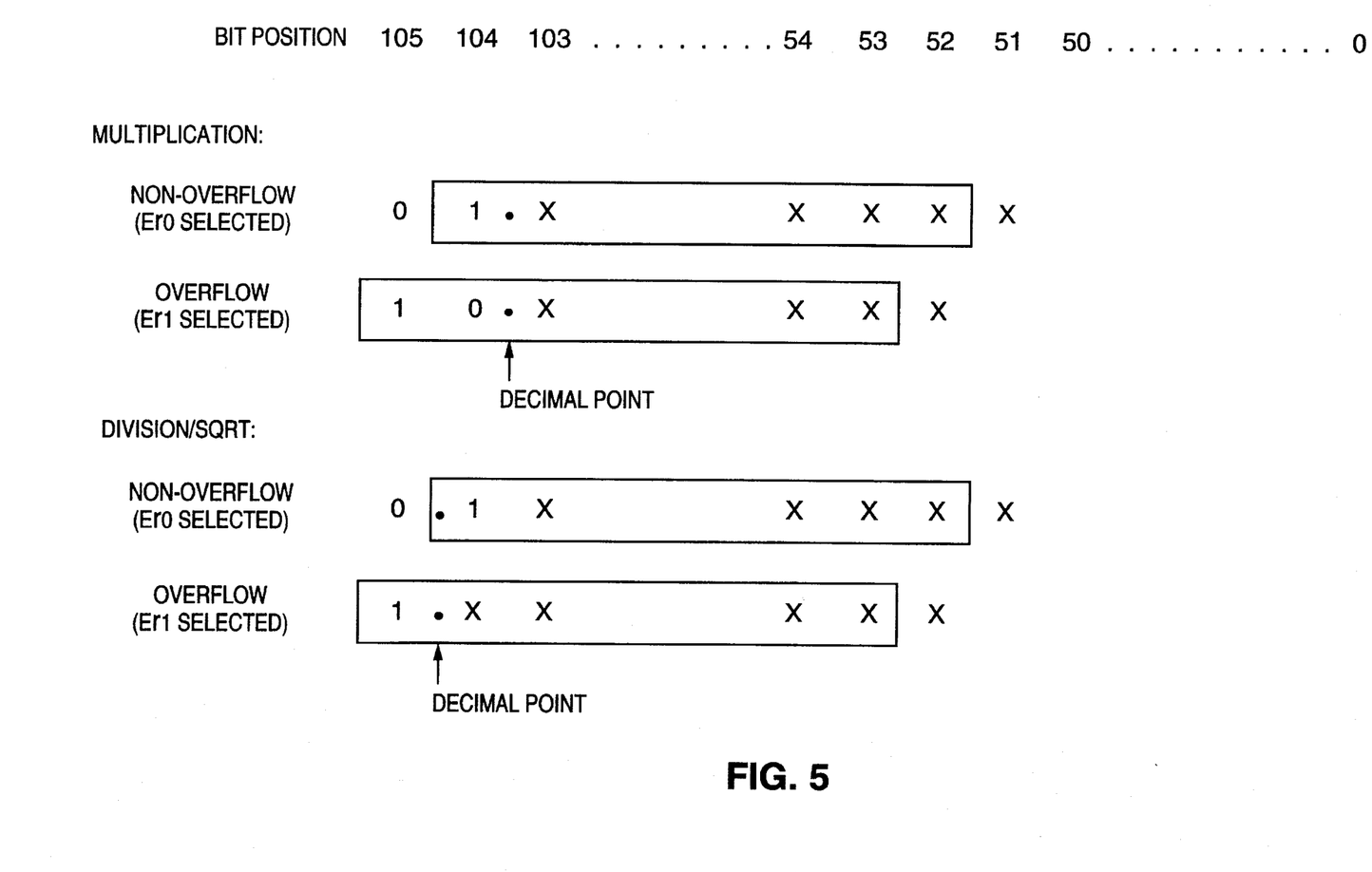
FIG. 5 illustrates the presumed decimal point placements and the mantissa selection according to mantissa overflow and non-overflow during multiplication and division or square root operations.

An important distinction, however, between multiplication, division, and square root is the handling of mantissa overflow. FIG. 5 illustrates how the mantissa output is chosen in cases of mantissa non-overflow and mantissa overflow. In multiplication, the incremented exponent Er1 is used if an overflow into the most significant mantissa bit position occurs. In multiplication, the decimal point is between bit positions 104 and 103. In division and square root, however, the decimal point is defined to be immediately to the right of the most significant mantissa bit, thus between bit positions 105 and 104. Therefore, if the mantissa's most significant bit is zero, then the decremented exponent is selected. The following table shows how the exponent is selected for multiplication, division, and square root.

| Mantissa | Multiply | Divide/Sqrt |
|---|---|---|
| Overflow (Er1) | Er + 1 | Er |
| Non-overflow (Er0) | Er | Er |

As illustrated in FIG. 5, for division and square root, overflow is defined so as to occur whenever the one and only bit to the left of the decimal point is non-zero; if the bit to the left of the decimal point is zero, non-overflow has occurred. If the most significant bit of the output mantissa is zero, then the correct exponent output should be decremented by one relative to the value computed by equations 12 and 13.

In order to accommodate the asymmetry between overflow and non-overflow for multiplication and division/square root, the values computed in carry-save format at the output of the carry-save adder 106 are adjusted for division and square root by subtracting one from equations 15 and 16 to take advantage of the fact that Er+1 is not required for division and square root, while Er−1 is required for non-overflow. Therefore, the non-overflow values Er0 computed by the datapath 30 are the following.

Multiplication:

$$Er=E1+E2+/B+1 \qquad (20)$$

Division:

$$Er=E1+/E2+B \qquad (21)$$

Square Root:

$$Er=(E2+B)>>1 \qquad (22)$$

In the case of square root, subtracting one from the equation 16 does not alter it, because the least significant bit of the square root computation is right shifted (truncated) anyway.

Error detectors 113 & 114 take Er0 and Er1 as inputs to determine whether or not Er0 or Er1 are of such a value as to represent exponent underflow or exponent overflow. If Er0<Emin or Er0>Emax, then either underflow or overflow will occur, respectively, if Er0 is subsequently selected. Similarly, if Er1<Emin or Er1>Emax, then either underflow or overflow, respectively, will occur if Er1 is subsequently selected. The underflow signals are useful to indicate that the resulting mantissa must be adjusted so as to be subnormal, if possible. If the exponent underflow adjustment to the mantissa requires the mantissa to be shifted to the right to the sticky bit position or beyond, then gross underflow occurs, and the result is too small to be represented.

Flip-flop registers 115 & 116 latch Er0 and Er1, respectively, when a division or square root operation is pending. The division and square root algorithms typically are iterative, such that each iteration produces a mantissa bit. Even when division is implemented in hardware, at most only a few bits of mantissa per cycle are produced. The division and square root instructions typically require several cycles to complete execution. Because the divider/square root unit produces only three mantissa bits per cycle, the resultant division mantissa is not fully computed until quite a few cycles after the division instruction was dispatched to the floating point unit. The computation of an entire floating point division mantissa therefore requires several cycles.

In contrast, the exponent calculations for division and square root are relatively straightforward, and are no more complex than the exponent computations for multiplication. Because the mantissa units for multiplication and division/square root are separate, there is no reason why one or more multiplication operations cannot be executed while the division or square root mantissa is being computed. Because the exponent calculation hardware 30 according to the present invention is shared between the multiplication and division/square root units, it is necessary to store division/square root exponents while the division/square root mantissa is being computed, so that when the division/square root mantissa is complete, the corresponding exponent will be available to output during the same cycle. Therefore, the Er0 and Er1 division/square root exponents are latched in flip-flop registers 115 & 116 until the division mantissa computation has completed. In the meantime, while division exponents are being stored, multiplication exponents can be computed using the hardware 30.

Multiplexors 117 & 118 select between the presently calculated exponents and the saved exponents calculated for a pending division or square root operation. Multiplexor 119 selects between the least significant eleven bits of Er0 [110:0] and the least significant eleven bits of Er1[10:0] depending upon the type of operation and the overflow/non-overflow result in the corresponding mantissa computation. Multiplexor 119 outputs Er, the resulting computed exponent. The twelfth bits Er0[111] and Er1[11] output from multiplexors 117 & 118, respectively, indicate whether or not Er0 or Er1 have overflown the positive representable range of exponents. Thus, Er0[111] is labeled "ovf0n2" to indicate that an overflow condition for Er0 has been detected. Similarly Er1[11] is labeled "ovf1n2" to indicate that an overflow condition for Er1 has been detected. The thirteenth bits Er0[112] and Er1[12] output from multiplexors 117 & 118, respectively, indicate whether or not Er0 or Er1 have underflown the representable range of exponents. In two's complement number representations, the most significant bit is the sign bit. Therefore, if Er0[12], labeled "unf0n2" is asserted Er0 is negative, and has underflown, Similarly, if Er1[12], labeled "unf1n2" is asserted, Er1 is negative, and has underflown.

The datapath illustrated in FIG. 4 has been drawn without showing any flip-flop registers which exist for pipelining purposes. In any reasonably high frequency implementation, several pipeline registers would probably be utilized in the design. For example, pipeline registers would probably be inserted between the carry-save adder 106 and the conditional sum adder 112. A second set of pipeline registers could be inserted between the multiplexors 117 & 118 and multiplexor 119. Depending upon the logical partitioning of the surrounding circuitry, the pipeline registers could be placed elsewhere in the circuit without departing from the spirit and scope of the present invention.

There are a variety of obvious variations of the preferred embodiment of the present invention that do not depart from the spirit and scope of the present invention. For example, the right shifter 101 could be eliminated so that whenever a square root operation were performed, a preprogrammed right shifted version of the proper bias would be available from multiplexor 100. This would require a 9-to-1 multiplexor. Another obvious variation involves implementing equation 16 rather than equation 17. By performing the right shifting after the addition, two of the biases in the bias multiplexor 100 could be eliminated as well as the right shifted input to multiplexor 103. The right shifting would then occur either on carry and sum portions 110 & 111 or on Er0 and Er1.

While the present invention has been disclosed with particular reference to its preferred embodiment, that embodiment is presented by way of example, not by way of limitation. Those of ordinary skill in the art would be enabled by this disclosure to add to or modify the embodiment of the present invention in various ways as needed and still be within the scope and spirit of the present invention as recited in the appended claims. Accordingly, various changes and modifications which are obvious to a person skilled in the art to which the invention pertains are deemed to lie within the spirit and scope of the invention as claimed.

What is claimed is:

1. An exponent calculation circuit that computes a resultant exponent for either multiplication or a second floating point function, the exponent calculation circuit comprising:

a bias selection circuit that supplies a bias that is either a multiplication bias or a second floating point function bias;

a second operand exponent selection circuit that supplies a selected second operand exponent that is either a multiplication second operand exponent or a second floating point function second operand exponent;

an exponent computation circuit that takes the selected bias, the selected second operand exponent output, and a first operand exponent as inputs and computes an operation result;

a register that stores the operation result for a second floating point function and produces a stored operation result; and an output selection circuit that selects between the stored operation result and the operation result.

2. An exponent calculation circuit as in claim 1, wherein the second floating point function is division.

3. An exponent calculation circuit as in claim 1, wherein the second floating point function is square root.

4. An exponent calculation circuit as in claim 1, wherein the multiplication bias is either a single precision multiplication bias or a double precision multiplication bias.

5. An exponent calculation circuit as in claim 1, wherein the second floating point function bias is either a single precision second floating point function bias or a double precision floating point function bias.

6. A method of providing an exponent calculation circuit that computes a resultant exponent for either multiplication or a second floating point function, the method comprising the steps of:

providing a bias selection circuit that supplies a bias that is either a multiplication bias or a second floating point function bias;

providing a second operand exponent selection circuit that supplies a selected second operand exponent that is either a multiplication second operand exponent or a second floating point function second operand exponent;

providing an exponent computation circuit that takes the selected bias, the selected second operand exponent output, and a first operand exponent as inputs and computes an operation result;

providing a register that stores the operation result for a second floating point function and produces a stored operation result; and providing an output selection circuit that selects between the stored operation result and the operation result.

7. A method of providing an exponent calculation circuit as in claim 6, wherein the second floating point function is division.

8. A method of providing an exponent calculation circuit as in claim 6, wherein the second floating point function is square root.

9. A method of providing an exponent calculation circuit as in claim 6, wherein the multiplication bias is either a single precision multiplication bias or a double precision multiplication bias.

10. A method of providing an exponent calculation circuit as in claim 6, wherein the second floating point function bias is either a single precision second floating point function bias or a double precision floating point function bias.

11. An exponent calculation circuit that takes a first operand exponent and a second operand exponent as inputs and produces a resultant exponent as output, the exponent calculation circuit comprising:

a first input exponent multiplexor that takes the first operand exponent and zero as data inputs, that takes a first input exponent multiplexor control signal as a control input, and that produces a first selected exponent as output;

a second input exponent multiplexor that takes the second operand exponent, a right-shifted second operand exponent, and a one's complement second operand exponent as data inputs, that takes a second input exponent multiplexor control signal as a control input, and that produces a second selected exponent as output;

a bias multiplexor that takes a single precision division bias, a double precision division bias, a single-to-double precision multiplication bias, a single precision multiplication bias, a double precision multiplication bias, a single precision square root bias, and a double precision square root bias as data inputs, that takes a bias multiplexor control signal as a control input, and that produces a selected bias as output;

a right shifter that takes the selected bias as data input, that takes a right shifter control signal as a control input, and that produces a right shifter selected bias, such that the right shifter selected bias is equivalent to the selected bias shifted in a less significant direction when the right shifter control signal is asserted, and such that the right shifter selected bias is equivalent to the selected bias when the right shifter control signal is deasserted;

a carry save adder that takes the right shifter selected bias, the first selected exponent, and the right shifter selected bias as inputs, and produces an exponent carry portion and an exponent sum portion as outputs; and a conditional sum adder that takes the exponent carry portion and the exponent sum portion as inputs, and produces a non-redundant exponent and an incremented non-redundant exponent as outputs.

12. An exponent calculation circuit as in claim 11, further comprising:

an second operand exponent inverter that takes the second operand exponent as input and produces the one's complement second operand exponent.

13. An exponent calculation circuit as in claim 11, wherein the right shifted second operand exponent equals the second operand exponent divided by two.

14. An exponent calculation circuit as in claim 11, wherein the right shifter selected bias equals the selected bias divided by two.

15. An exponent calculation circuit as in claim 11, further comprising:

a mantissa non-overflow exponent register that takes the non-redundant exponent as data input, that takes a mantissa non-overflow exponent register control signal as a control input, and that produces a stored non-redundant exponent as output;

a mantissa overflow exponent register that takes the incremented non-redundant exponent as input, that takes a mantissa overflow exponent register control signal as a control input, and that produces a stored incremented non-redundant exponent as output;

a mantissa non-overflow exponent multiplexor that takes the non-redundant exponent and the stored non-redundant exponent as data inputs and a mantissa non-overflow multiplexor control signal as a control input, and that produces a selected non-redundant exponent as output;

a mantissa overflow exponent multiplexor that takes the incremented non-redundant exponent and the stored non-redundant exponent as data inputs and a mantissa overflow exponent multiplexor control signal as a control input, and that produces a selected incremented non-redundant exponent as output; and an output multiplexor that takes the selected non-redundant exponent and the selected incremented non-redundant exponent as data inputs and an output multiplexor control signal as a control input, and produces the resultant exponent as output.

16. An exponent calculation circuit as in claim 15, wherein the first input exponent multiplexor control signal is set such that the first selected exponent is the first operand exponent, wherein the second input exponent multiplexor control signal is set such that the second selected exponent is the second operand exponent, wherein the bias multiplexor control signal is set such that the selected bias is either the single precision multiplication bias if both operands and a floating point result are both single precision floating point numbers, the double precision multiplication bias if both operands and the floating point result are both double precision floating point numbers, or the single-to-double precision multiplication bias if both operands are single precision floating point numbers and the floating point result is a double precision floating point number, wherein the right shifter control signal is set such that the right shifter selected bias is the selected bias, wherein the mantissa non-overflow exponent multiplexor control signal is set such that the selected non-redundant exponent is the non-redundant exponent, wherein the mantissa overflow exponent multiplexor control signal is set such that the selected incremented non-redundant exponent is the incremented non-redundant exponent, wherein the output multiplexor control signal is set such that the resultant exponent is the selected non-redundant exponent when a mantissa non-overflow occurs and is the selected incremented non-redundant exponent when a mantissa overflow occurs, and such that the resultant exponent is appropriate for a floating point multiplication operation.

17. An exponent calculation circuit as in claim 15, wherein the first input exponent multiplexor control signal is set such that the first selected exponent is the first operand exponent, wherein the second input exponent multiplexor control signal is set such that the second selected exponent is the one's complement second operand exponent, wherein the bias multiplexor control signal is set such that the selected bias is either the single precision division bias if both operands and a floating point result are both single precision floating point numbers or the double precision division bias if both operands and the floating point result are both double precision floating point numbers, wherein the right shifter control signal is set such that the right shifter selected bias is the selected bias, wherein the mantissa non-overflow exponent register control signal is set such that the non-redundant exponent is stored in the mantissa non-overflow exponent register, wherein the mantissa overflow exponent register control signal is set such that the incremented non-redundant exponent is stored in the mantissa overflow exponent register, such that the stored non-redundant exponent corresponds to a mantissa non-overflow floating point division operation and the stored incremented non-redundant exponent corresponds to a mantissa overflow floating point division operation.

18. An exponent calculation circuit as in claim 17, wherein the mantissa non-overflow exponent multiplexor control signal is set such that the selected non-redundant exponent is the stored non-redundant exponent, wherein the mantissa overflow exponent multiplexor control signal is set such that the selected incremented non-redundant exponent is the stored incremented non-redundant exponent, wherein the output multiplexor control signal is set such that the resultant exponent is the selected non-redundant exponent when a mantissa non-overflow occurs and is the selected incremented non-redundant exponent when a mantissa overflow occurs, and such that the resultant exponent is appropriate for a floating point division operation.

19. An exponent calculation circuit as in claim 15, wherein the first input exponent multiplexor control signal is set such that the first selected exponent is zero, wherein the second input exponent multiplexor control signal is set such that the second selected exponent is the right shifted second operand exponent, wherein the bias multiplexor control signal is set such that the selected bias is either the single precision division bias if the second operand exponent is even and both operands and a floating point result are both single precision floating point numbers, the double precision division bias if the second operand exponent is even and both operands and the floating point result are both double precision floating point numbers, the single precision square root bias if the second operand exponent is odd and both operands and a floating point result are both single precision floating point numbers, or the double precision square root bias if both operands and the floating point result are both double precision floating point numbers, wherein the right shifter control signal is set such that the right shifter selected bias is the selected bias shifted in a less significant direction, wherein the mantissa non-overflow exponent register control signal is set such that the non-redundant exponent is stored in the mantissa non-overflow exponent register, wherein the mantissa overflow exponent register control signal is set such that the incremented non-redundant exponent is stored in the mantissa overflow exponent register, and such that the stored non-redundant exponent corresponds to a mantissa non-overflow floating point square root operation and the stored incremented non-redundant exponent corresponds to a mantissa overflow floating point square root operation.

20. An exponent calculation circuit as in claim 19, wherein the mantissa non-overflow exponent multiplexor control signal is set such that the selected non-redundant exponent is the stored non-redundant exponent, wherein the mantissa overflow exponent multiplexor control signal is set such that the selected incremented non-redundant exponent is the stored incremented non-redundant exponent, wherein the output multiplexor control signal is set such that the resultant exponent is the selected non-redundant exponent when a mantissa non-overflow occurs and is the selected incremented non-redundant exponent when a mantissa overflow occurs, and such that the resultant exponent is appropriate for a floating point square root operation.

21. An exponent calculation circuit as in claim 11, further comprising:

a mantissa non-overflow exponent out-of-range detector that takes the non-redundant exponent as input and produces an exponent underflow signal and an exponent overflow signal as outputs, such that the exponent underflow signal indicates that the non-redundant exponent is less than a minimum representable exponent, and such that the exponent overflow signal indicates that the non-redundant exponent is greater than a maximum representable exponent; and a mantissa overflow exponent out-of-range detector that takes the incremented non-redundant exponent as input and produces an incremented exponent underflow signal and an incremented exponent overflow signal as outputs, such that the incremented exponent underflow signal indicates that the incremented non-redundant exponent is less than the minimum representable exponent, and such that the incremented exponent overflow signal indicates that the incremented non-redundant exponent is greater than the maximum representable exponent.

22. An exponent calculation circuit as in claim 11, wherein the single precision division bias is 007F, the double precision division bias is 03FF, the single-to-double precision multiplication bias is 0301, the single precision multiplication bias is is 1F81, the double precision multiplication bias is 1C01, the single precision square root bias is 0080, and the double precision square root bias is 0400.

23. A method of performing an exponent calculation from a first operand exponent and a second operand exponent to produce a resultant exponent, the method comprising the steps of:

(a) selecting a first selected exponent from among the first operand exponent and zero;

(b) selecting a second selected exponent from among the second operand exponent, a right-shifted second operand exponent, and a one's complement second operand exponent;

(c) selecting a selected bias from among a single precision division bias, a double precision division bias, a single-to-double precision multiplication bias, a single precision multiplication bias, a double precision multiplication bias, a single precision square root bias, and a double precision square root bias;

(d) selectively shifting the selected bias to the right to produce a right shifted selected bias;

(e) adding the right shifted selected bias, the first selected exponent, and the right shifted selected bias to produce an exponent carry portion and an exponent sum portion; and (f) adding the exponent carry portion and the exponent sum portion to produce a non-redundant exponent and an incremented non-redundant exponent.

24. A method of performing an exponent calculation as in claim 23 further comprising the step of:

inverting the second operand exponent to produce the one's complement second operand exponent.

25. A method of performing an exponent calculation as in claim 23 wherein the right-shifted second operand exponent equals the second operand exponent divided by two.

26. A method of performing an exponent calculation as in claim 23 wherein the right shifted selected bias equals the selected bias divided by two.

27. A method of performing an exponent calculation as in claim 23 further comprising the steps of:

(g) storing the non-redundant exponent to produce a stored non-redundant exponent;

(h) storing the incremented non-redundant exponent to produce a stored incremented non-redundant exponent;

(i) selecting between the non-redundant exponent and the stored non-redundant exponent to produce a selected non-redundant exponent;

(j) selecting between the incremented non-redundant exponent and the stored incremented non-redundant exponent to produce a selected incremented non-redundant exponent; and (k) selecting between the selected non-redundant exponent and the selected incremented non-redundant exponent to produce the resultant exponent.

28. A method of performing an exponent calculation as in claim 27, wherein step (a) selects the first operand exponent, wherein step (b) selects the second operand exponent, wherein step (c) selects either the single precision multiplication bias if both operands and a floating point result are both single precision floating point numbers, the double precision multiplication bias if both operands and the floating point result are both double precision floating point numbers, or the single-to-double precision multiplication bias if both operands are single precision floating point numbers and the floating point result is a double precision floating point number, wherein step (d) selects not to shift the selected bias to the right, wherein step (i) selects the non-redundant exponent, wherein step (j) selects the incremented non-redundant exponent, wherein step (k) selects the selected non-redundant exponent when a mantissa non-overflow occurs and selects the selected incremented non-redundant exponent when a mantissa overflow occurs, and such that the resultant exponent is appropriate for a floating point multiplication operation.

29. A method of performing an exponent calculation as in claim 27, wherein step (a) selects the first operand exponent, wherein step (b) selects the one's complement second operand exponent, wherein step (c) selects either the single precision division bias if both operands and a floating point result are both single precision floating point numbers or the double precision division bias if both operands and the floating point result are both double precision floating point numbers, wherein step (d) selects not to shift the selected bias to the right, and such that the stored non-redundant exponent corresponds to a mantissa non-overflow floating point division operation and the stored incremented non-redundant exponent corresponds to a mantissa overflow floating point division operation.

30. A method of performing an exponent calculation as in claim 29, wherein step (i) selects the stored non-redundant exponent, wherein step (j) selects the stored incremented non-redundant exponent, wherein step (k) selects the selected non-redundant exponent when a mantissa non-overflow occurs and selects the selected incremented non-redundant exponent when a mantissa overflow occurs, and such that the resultant exponent is appropriate for a floating point division operation.

31. A method of performing an exponent calculation as in claim 27, wherein step (a) selects the zero, wherein step (b) selects the right-shifted second operand exponent, wherein step (c) selects either the single precision division bias if the second operand exponent is even and both operands and a floating point result are both single precision floating point numbers, the double precision division bias if the second operand exponent is even and both operands and the floating point result are both double precision floating point numbers, the single precision square root bias if the second operand exponent is odd and both operands and a floating point result are both single precision floating point numbers, or the double precision square root bias if both operands and the floating point result are both double precision floating point numbers, wherein step (d) selects to shift the selected bias to the right, and such that the stored non-redundant exponent corresponds to a mantissa non-overflow floating point square root operation and the stored incremented non-redundant exponent corresponds to a mantissa overflow floating point square root operation.

32. A method of performing an exponent calculation as in claim 31, wherein step (i) selects the stored non-redundant exponent, wherein step (j) selects the stored incremented non-redundant exponent, wherein step (k) selects the selected non-redundant exponent when a mantissa non-overflow occurs and selects the selected incremented non-redundant exponent when a mantissa overflow occurs, and such that the resultant exponent is appropriate for a floating point square root operation.

33. A method of performing an exponent calculation as in claim 23 further comprising the steps of:

detecting if the non-redundant exponent is less than a minimum representable exponent;

detecting if the non-redundant exponent is greater than a maximum representable exponent; and detecting if the-incremented non-redundant exponent is less than the minimum representable exponent; and detecting if the incremented non-redundant exponent is greater than the maximum representable exponent.

34. A method of performing an exponent calculation as in claim 23, wherein the single precision division bias is 007F, the double precision division bias is 03FF, the single-to-double precision multiplication bias is 0301, the single precision multiplication bias is 1F81, the double precision multiplication bias is 1C01, the single precision square root bias is 0080, and the double precision square root bias is 0400.

\* \* \* \* \*